4 Sheets—Sheet 1.
E. W. SHIPPEN.
ART OF MAKING WOODEN SHOES AND MACHINERY FOR MAKING THEM.
No. 173,820. Patented Feb. 22, 1876.
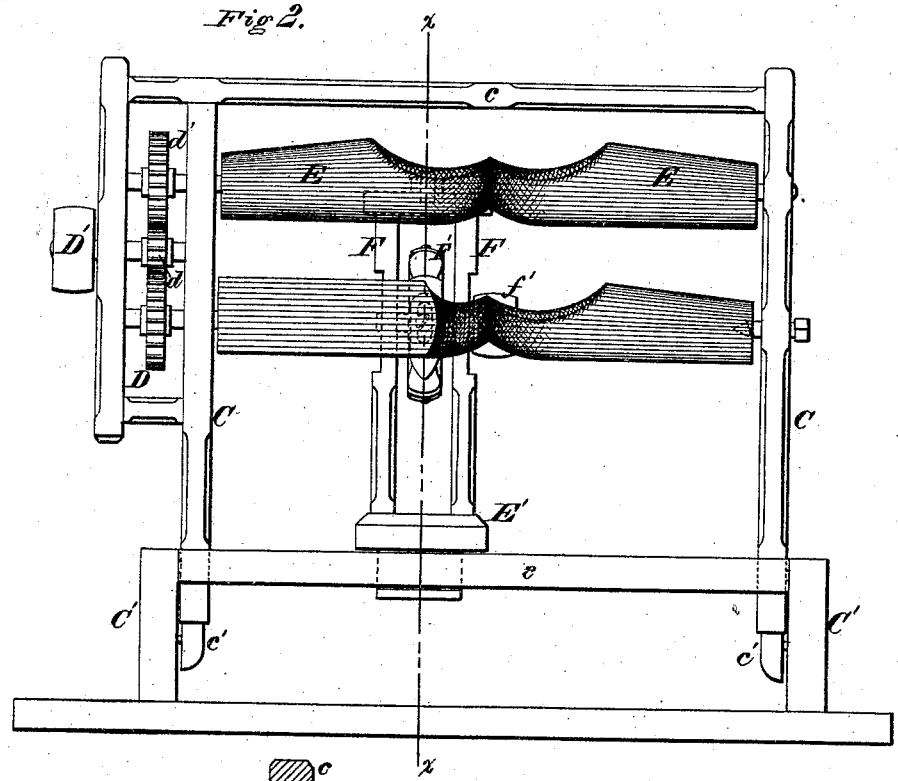
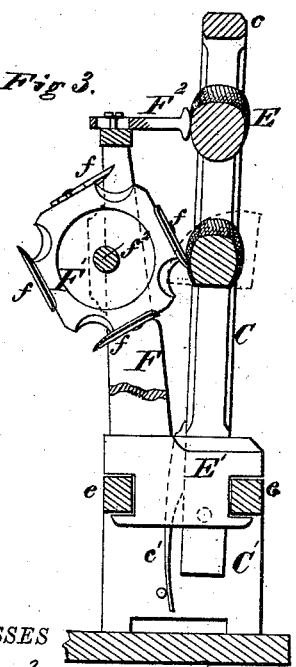
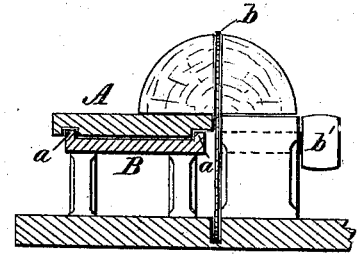
WITNESSES
Harry King.
H. H. Young.
Evans W. Shippen. INVENTOR
By his Attorney
W. D. Baldwin

E. W. SHIPPEN.
ART OF MAKING WOODEN SHOES AND MACHINERY FOR MAKING THEM.

No. 173,820. Patented Feb. 22, 1876.

WITNESSES
Harry King
H. H. Young

Evans W. Shippen. INVENTOR

By his Attorney
Wm. D. Baldwin

4 Sheets—Sheet 3.
E. W. SHIPPEN.
ART OF MAKING WOODEN SHOES AND MACHINERY FOR MAKING THEM.
No. 173,820.  Patented Feb. 22, 1876.
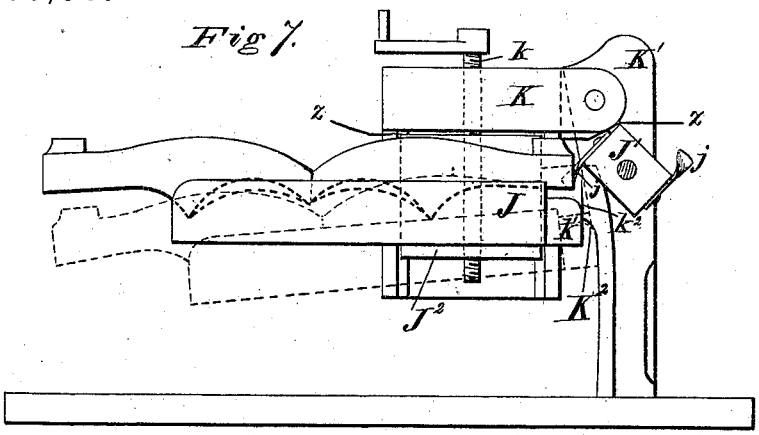
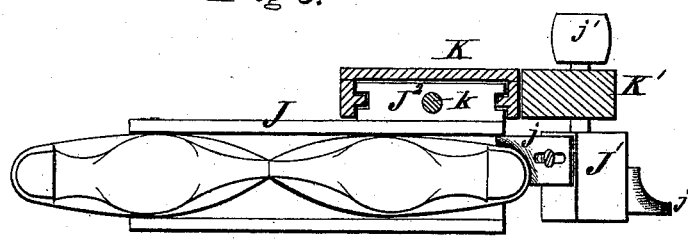
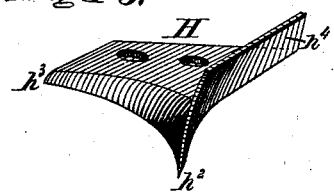
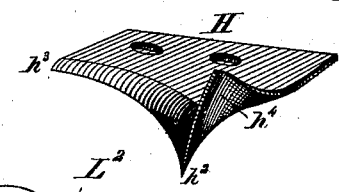
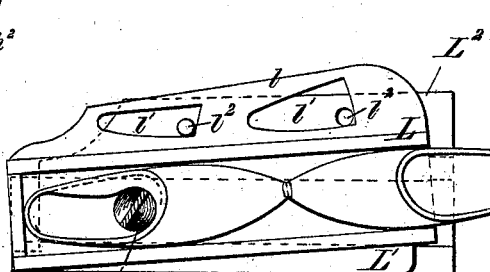
WITNESSES
Harry King
H. H. Young
Evans W. Shippen, INVENTOR
By his Attorney
W. D. Baldwin
N. PETERS, PHOTO-LITHOGRAPHER, WASHINGTON, D.C.

E. W. SHIPPEN.
ART OF MAKING WOODEN SHOES AND MACHINERY FOR MAKING THEM.

No. 173,820. Patented Feb. 22, 1876.

WITNESSES
Harry King
H. H. Young

Evans W. Shippen. INVENTOR.

By his Attorney
Wm. D. Baldwin

UNITED STATES PATENT OFFICE.

EVANS W. SHIPPEN, OF MEADVILLE, PENNSYLVANIA.

IMPROVEMENT IN THE ART OF MAKING WOODEN SHOES AND MACHINERY FOR MAKING THEM.

Specification forming part of Letters Patent No. 173,820, dated February 22, 1876; application filed May 10, 1875.

*To all whom it may concern:*

Be it known that I, EVANS W. SHIPPEN, of Meadville, in the county of Crawford and State of Pennsylvania, have invented certain new and useful Improvements in the Art of Manufacturing Wooden Shoes, and in Machinery for Making them, of which the following is a specification:

The objects of my invention are to manufacture, by mechanism, wooden shoes and sandals, by which mechanism the blanks from which the shoes or sandals are made are shaped, and completely finished both inside and outside; so to form the blanks as to make two shoes at once; and so to operate upon each blank as to make "rights and lefts," or a pair of shoes.

The subject-matter claimed will hereinafter specifically be designated.

Figure 4:
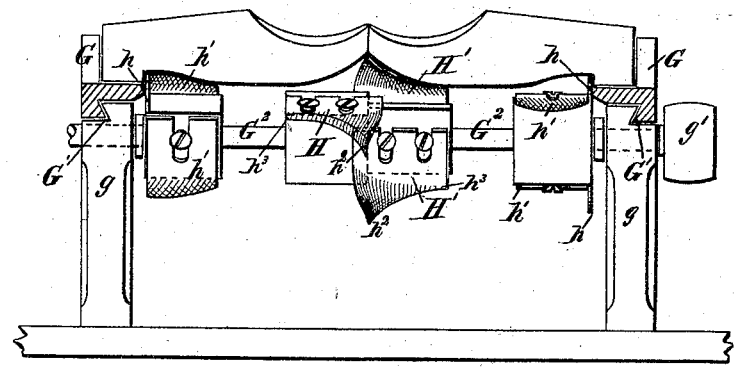
Figure 5:
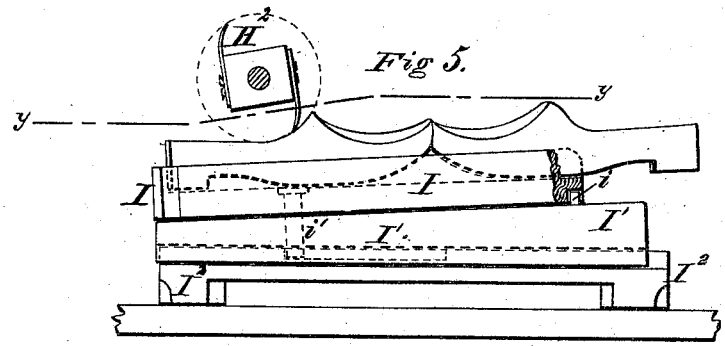
Figure 6:
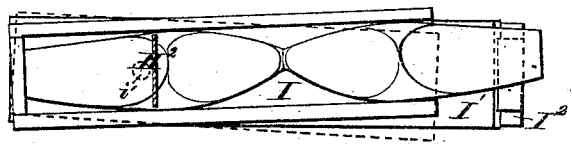
Figure 10:
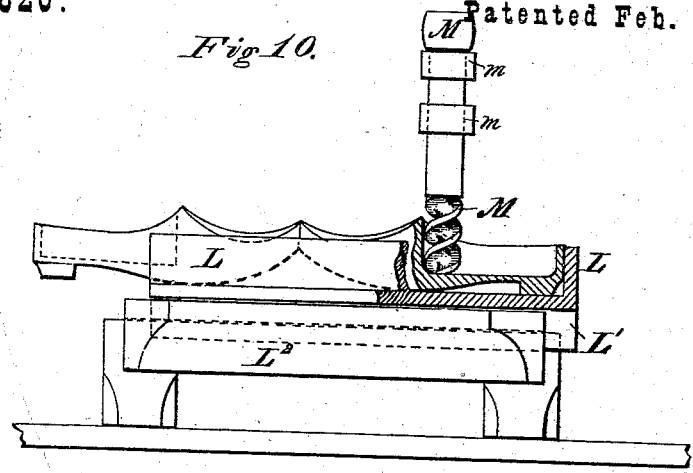
Figure 11:
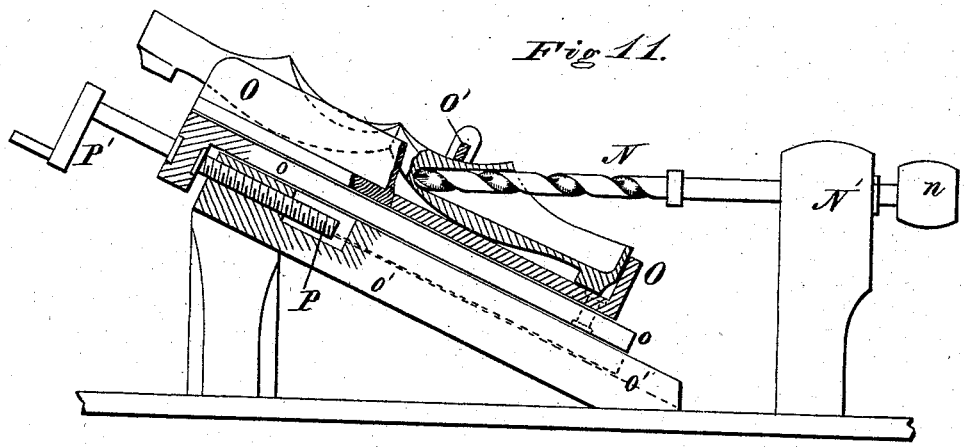
Figure 12:
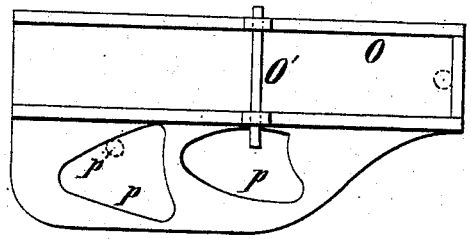

In the accompanying drawings, which show mechanism adapted to carry out my improvements in the best way now known to me, Figure 1 represents an end view, partly in section, showing a sliding table and circular saw for cutting the blank from the log. Fig. 2 is a side elevation of the first shaping mechanism for turning the outside of the blank; Fig. 3, a vertical section through the same on the line $x$ $x$ of Fig. 2. Fig. 4 is a view in elevation, showing a sliding frame or carrier for holding the blank, and the second shaping knives or cutters, with the sliding frame partly in section. Fig. 5 is a view, partly in section, of a sliding vibrating holder, and a revolving cutter for cutting and shaping the tops of the shoes from the insteps back; Fig. 6, a plan view of the same, partly in section on the line $y$ $y$ of Fig. 5. Fig. 7 is a view in elevation of the heel-shaping mechanism. Fig. 8, a plan view of the same, partly in section on the line $z$ $z$ of Fig. 7. Fig. 9 is a plan view of the holder for carrying the blank while being operated upon by the tool which cuts out the inside of the shoe between the heel and the instep; Fig. 10, a view, partly in elevation and partly in section, of the same, showing the tool and its supports. Fig. 11 is a view, partly in elevation and partly in section, of mechanism for boring out the inside of the shoe between the instep and toe; Fig. 12, a plan view of a portion of the same, showing the clamp or holder for carrying the blank; Fig. 13, a view, in perspective, of one of the cutters for rounding up the toes; and Fig. 14, a similar view of a slightly-modified form of cutter.

The wood out of which the shoes are to be made may be cut into blanks in any suitable way. The blanks are herein shown as formed by means of a sliding table, A, which carries the log or blocks, and moves on guideways $a$ $a$ on its support B, feeding the log to a circular saw, $b$, revolved by means of a pulley, $b'$, on one end of its shaft. A blank, being formed of proper transverse area, preferably having at least one flat side, and of suitable length to form two shoes, is secured so as to revolve in a frame capable of swinging or vibrating, such as used for turning irregular forms, consisting in this instance of uprights C C, connected by a cross-bar or brace, $c$, pivoted near their lower ends in a fixed support, C', and provided with springs $c'$ $c'$, bearing against stop-pins in the support, which tend to swing the frame toward the cutters which shape the blank.

The blank may be revolved by means of a pinion, D, secured on a shaft, forming a continuation of the centering-pin, on which the blank is fixed at one end. This pinion gears with a smaller pinion, $d$, upon the shaft of which the driving-pulley D' is secured. A pattern, E, for controlling the work, is likewise revolved at a rate of speed corresponding to that imparted to the blank, by means of a gear, $d'$, upon the shaft of which the pattern is fixed at one end like the blank, this gear $d'$ meshing with the small pinion $d$, by which means the blank and pattern are positively revolved in the same direction, with like speed. A sliding carrier, E', moving on ways or rails $e$ $e$, (shown herein as formed by the bars which connect the opposite ends of the support C',) is provided with a frame, F, fixed thereto, in which is mounted a rotary cutter, to the head $F^1$ of which detachable adjustable curved knives or cutters $f$ are secured. A pulley, $f^1$, on the shaft $f^2$ of the cutter-head serves to communicate the desired notch to the cutters. A controlling arm or guide, $F^2$, is adjustably secured upon the top of the sliding cutter-frame F, and bears with its rounded end against the revolving pattern E, which, owing to its yielding frame C, always bears against the arm, and thus shapes the blank like the pattern, as the cutter-frame is moved back and forth by its sliding frame, by hand or automatically, in any well-known way.

Having thus shaped the top of the two shoes or blank from the instep to the toe, partially shaped the top from the instep back, and slightly curved the sole at the toe, the blank is fixed, with the flat or sole part down, in a sliding table, G, moving at either end in a way, $G^1$, in a frame or support, $g$, so that the frame, while free to be moved back and forth, is prevented from being vertically displaced. A shaft, $G^2$, is revolved in bearings in the supports $g$ by means of a pulley, $g'$, and carries a series of cutters for shaping the bottom of the shoe, while leaving it flat transversely.

I prefer to removably secure these cutters to their respective heads in such manner as to admit of adjustment to suit variations in the shape and size of the shoes, and to secure the heads to the shaft by set-screws, to allow of longitudinal adjustment to suit such changes. The blank may be adjusted higher or lower in the frame for the same purpose.

In this instance the vertical cuts to form the fronts of the heels are made by cutters $h$, the recesses or depressions between the heels and centers of the shoes are formed by cutters $h^1$, while the rounding up lengthwise of the soles at the toes is effected by bent, twisted cutters H $H^1$, the heads of which are arranged on each side of the center of the shaft $G^2$. By the peculiar construction of the knives H $H^1$ they each commence cutting, with their upper parts or points $h^2$ at the center of the blank, (or toe of the shoe,) crosswise of the grain, or squarely across the blank, rounding up the soles lengthwise at the toes, while gradually crossing the grain toward the ball of the sole as the lower portions of the cutters comes into action, the points or edges $h^3$ of the cutters, opposite to the points $h^2$, working parallel with the grain of wood at the ball of the sole. Thus, owing to their twist or irregular curve, the cutters cut across the grain at $h^2$, against, across, and with the grain between $h^2$ and $h^3$, and with the grain at and near $h^3$. By bending or turning up the metal of the cutters at a right angle, or thereabout, from the edges to the backs, as at $h^4$, the proper twist may be given the cutters to advance the point $h^2$ beyond the main portion of the cutting-edge, and they are rendered stiff and strong, (see Fig. 13;) or the cutter may be made with a bend from the point $h^2$ part only of the distance toward the back, as in Fig. 14. The blank (or pair of partially-formed shoes) is taken next to a sliding form or holder, I, which is movable toward, and under, and away from a rotary cutter, $H^2$, the knives of which are removably and adjustably secured in the head, to adapt the cutter to the shaping of different-sized shoes. This cutter shapes the ends of the blank (or each shoe) by reversing the blank in the holder, from the heel to the instep or highest point of the top. The holder is preferably constructed of a trough shape, and pivoted upon a sliding block, $I^1$, so as to have a limited horizontal play. The extent of the vibration of the holder upon the pivot in the block may be limited by a stop, $i$, fixed in the block between the flanged under edges of the holder. The movement of the holder on its block toward the cutter may be limited by the pivot $i'$, which connects the holder and block, the groove in which the pivot works in the supporting piece or frame $I^2$ terminating at the proper point to stop the holder in the inward movement in the position shown in Fig. 5.

In order to form the heel of the shoe higher than that portion at the sides of the ankle, the holder is caused to move at an inclination to its frame. The upper surface of the block $I^1$, upon which the holder is secured and upon which it slides, is preferably inclined, thus accomplishing the desired result in a simple manner, as it is obvious that the cutter will not enter so far into the blank at the heel as at the portion of the blank between the heel and the curve of the instep. By swinging the holder on its pivot the desired shape to the instep or curve is given, cutting farther toward the toe on the inside (or great-toe side) of the shoe than on the outside, shaping the blank as shown in Fig. 6. For the right shoe the outer end of the holder is swung to the right after the blank is fed in to the limit of the inward movement of the holder, or as far as desired, and for left shoes it is swung to the left. In this manner the outside of the shoe may be made to extend higher, or more toward the heel, without interfering with the putting on of the shoe by the user, than it could if the cut terminated at the same distance from the toe both on the inside and outside.

The blank is next taken to the heel-shaping mechanism, where the heels of the blank (or pair of shoes) are shaped one at a time, while held in any suitable way in a clamp, J, by the action of a rotary cutter, $J^1$, the knives $j$ of which are formed so as to shape both the backs and sides of the heels. (See Figs. 7 and 8.) The cutter may be revolved by means of a pulley, $j'$, fast on its shaft, and the knives are preferably detachable as well as adjustable, to suit different-sized shoes, or those having different-shaped heels, and are bent and curved like those H $H^1$, before described. The holder or clamp J has both an up-and-down and an endwise movement, imparted in this instance in the following way: The holder is fixed to a carrier or block, $J^2$, capable of reciprocating vertically in a rock-frame, K, pivoted to a fixed frame or post, $K^1$, so as to rock or swing thereon when desired, the holder being moved up and down by a screw, $k$, and crank-arm to feed the blank with its end—heel of the shoe—past the cutter; and when the back and sides of the shoe, above the heel proper, have been trimmed and shaped by the cutters, as the holder is lowered across them, the crank is turned until the end $k^1$ of the holder, which had previously moved in contact with and been guided by the vertical part $k^2$ of the inner edge of the post or sustaining and guiding frame $K^1$, (or of a strip secured thereto,) descends opposite the curved recess or cut-away part $K^2$ of the post or strip, when the holder swings inward, (see dotted lines, Fig. 7,) and the cutter bevels or curves off the heel proper. The frame $K^1$ thus serves both to support and automatically control the movements of the holder and its carrying-block.

The blank (or pair of shoes) is next taken to the inside-forming mechanism, first to cut out that portion extending between the instep, or highest part of the shoe, and the heel, leaving a shell of the proper thickness around the sides and back. This first inside-forming mechanism may be constructed as follows: A holder, L, in which the blank is placed, is pivoted to move with and swing horizontally upon a sliding block, $L^1$, moving back and forth in a suitable stationary guiding frame, $L^2$, the swinging movement, as well as the sliding motion of the holder, being controlled by means of guide-slots $l^1 l^1$, in the projecting side or flange $l$ of the holder, through which slots project pins $l^2 l^2$. A boring-tool, M, revolved by means of a pulley, M', moves endwise in sustaining and guiding arms $m$ $m$, its downward movement being properly limited to prevent its cutting too deeply into the blank. In this manner, or with the holder moving up to the auger, each shoe of the blank is in turn cut out, as shown in section in Fig. 10, the lateral and endwise movement of the holder being such as to insure the proper sized cut being made. Different holders are used as varying-sized shoes are shaped, the guiding-slots being necessarily smaller or larger as the shoes vary in size.

I cut out and shape the inside of the shoe, under the top or upper, from the instep toward the toe, by means of a rotary cutting-tool or auger, N, which may be revolved by means of a pulley, $n$, in its bearing in a supporting-post, N'. This cutting-tool may either be fed along endwise to the blank or revolve in fixed relation to its bearing; in the latter case the tool or the blank should have an adjustable up-and-down movement to clear the heel and bore out beneath the instep. The endwise movement may be given the auger by means of levers, in the usual way. The blank may be fed to the tool, or be held stationary upon an inclined frame, while the auger moves up to and away from the work; or the auger may be inclined instead of the blank, and operate in the same manner and with the same result. In Fig. 11 the partially-completed blank (pair of shoes) is shown as clamped in a holder, O, by a clamp-bar, O', to hold the blank firmly while the boring-tool is cutting; and the holder is pivoted so as to vibrate or swing horizontally upon a sliding piece or block, $o$, having a movement in an inclined frame, $o'$, toward and from the boring-tool N, the inclination of the frame $o'$, and, consequently, that of the holder and blank, being such as to present the blank at the proper inclination for the tool to pass above the heels of the shoes and properly cut out the shoe beneath the upper or top part, as clearly shown in Fig. 11. The sliding holder may be fed to the tool and withdrawn therefrom in any suitable manner, such as by means of a screw, P, passing through the shouldered end or overlapping portion of the sliding block $o$, so as to revolve therein and move the block back and forth as the screw is revolved in the female screw of the frame $o'$ by means of the crank P'. The holder O is vibrated on its pivot in the block $o$, so as to cause the tool to cut out the shoe to the proper width and of the desired shape; the vibration being limited, to prevent the holder from being accidentally swung too far sidewise, by means of one or more guide-slots, $p$, in a flange or lateral extension of the holder, through which slots pins project from the frame $o'$. The slots, being of different sizes and allowing different degrees of play to the holder, are suitable for the boring out of different-sized shoes, as the controlling pin can be changed from one to the other. The movement of the holder and the blank toward the cutting-tool is also limited by the slot and its stop-pin.

It is obvious that instead of manufacturing two shoes at once, or in one piece, the machinery may readily be adapted to making single shoes by changing the pattern; that by adjusting the controlling or cutter-regulating arm $F^2$ toward or from the pattern wider or narrower shoes may be made by the same pattern; and that sandals could be manufactured by my improved machinery, the uppers or tops of the blanks being cut away by feeding them under the cutter $H^2$, so as to cut nearly to the toe ends of the blanks, after which the heels are finished off and the blanks bored or cut out slightly on top to leave a low ledge or rim around each sandal, to afford a rest for the foot and aid in securing the sandals to the feet of the wearer.

It will be seen that I am enabled to do the principal outside shaping of the shoes in an expeditious manner by my method of manufacturing two shoes, forming rights and lefts, from a single blank. There are fewer handlings of the blanks than there would be were the shoes manufactured singly, and when two shoes are completed they remain in pairs or fellows, connected at the toes until sold or used, thus avoiding much trouble in selecting from a mass shoes of the same size and arranging and fastening them in pairs.

From the foregoing description it will, moreover, be seen that my invention enables me to turn out a finished, symmetrically-formed shoe from a wooden blank by subjecting it to a series of consecutive mechanical manipulations, and economically and rapidly to produce a better article than the ordinary hand-made shoe.

I claim as my invention—

1. The improvement in the art of manufacturing wooden shoes by machinery hereinbefore set forth, which consists in cutting, shaping, and boring the blank by submitting it successively to the operation of mechanism, substantially such as set forth.

2. The combination, substantially as hereinbefore set forth, of a sliding table, G, upon which the partially-shaped blank is secured, and a series of revolving cutters, $h$ $h^1$ $H^1$, constructed substantially as described, which shape the under side of the blank, as set forth.

3. The combination of a sliding holder, I, moving on an incline, in which the blank is placed, and a revolving cutter, $H^2$, to which the blank is fed, these members being constructed and operating substantially as set forth, whereby the blank is cut away between the instep and heel of the shoe, and left higher at the heel than at a point intermediate of the heel and instep.

4. The combination of a revolving cutter, $H^2$, and a sliding vibrating holder carrying the blank, these members being constructed and operating substantially as set forth, whereby the shoes are cut away toward the toe, on the inside of the instep.

5. The combination, with a revolving cutter, $J^1$, constructed substantially as set forth, of a holder, J, a rocking reciprocating carrier, to which the holder is fixed, and a frame, $K^1$, for supporting and automatically guiding the holder, substantially as set forth.

6. The combination of a boring-tool and a sliding holder, O, in which the blank is clamped, these parts being arranged at an inclination to each other, substantially as and for the purpose set forth.

7. The combination of an inclined pivoted holder, a frame on which it slides, and a boring-tool, these members being constructed and operating substantially as set forth, to cut out the inside of the shoe.

8. The bent, twisted cutter, constructed substantially as set forth, with its cutting-edge curved, having points $h^2$ $h^3$ and turned portion $h^4$, for the purposes specified.

In testimony whereof I have hereunto subscribed my name.

EVANS W. SHIPPEN.

Witnesses:
A. M. WILLIAMS,
WM. B. CALLENDER.